US012803307B2

(12) United States Patent
Chintalapalli Patta et al.

(10) Patent No.: US 12,803,307 B2
(45) Date of Patent: Nov. 17, 2026

(54) AUTOMATED DOCKING SYSTEM FOR CHARGING CHARGEABLE MOBILE DEVICES

(71) Applicant: Tata Consultancy Services Limited, Mumbai (IN)

(72) Inventors: Venkat Raju Chintalapalli Patta, Bangalore (IN); Venkatesh Prasad Bangalore Srinivas, Bangalore (IN); Pradeep Prabhakar Kamble, Bangalore (IN); Swapnil Sunil Kalhapure, Bangalore (IN); Sreehari Kumar Bhogineni, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 740 days.

(21) Appl. No.: 18/347,846

(22) Filed: Jul. 6, 2023

(65) Prior Publication Data

US 2024/0030728 A1 Jan. 25, 2024

(30) Foreign Application Priority Data

Jul. 19, 2022 (IN) ............................. 202221041399

(51) Int. Cl.
*H02J 7/70* (2026.01)
*A47L 9/28* (2006.01)
*G06F 1/16* (2006.01)

(52) U.S. Cl.
CPC ............ *H02J 7/731* (2026.01); *A47L 9/2873* (2013.01); *G06F 1/1632* (2013.01); *A47L 2201/022* (2013.01)

(58) Field of Classification Search
CPC . H02J 7/731; H02J 7/70; A47L 9/2873; A47L 2201/022; G06F 1/1632;

(Continued)

(56) References Cited

U.S. PATENT DOCUMENTS 10,761,539 B2 9/2020 Moore et al.
2011/0061559 A1* 3/2011 Lund ......................... B60L 5/36 191/29 R (Continued)

FOREIGN PATENT DOCUMENTS

EP 2756786 A2 7/2014

OTHER PUBLICATIONS

M V Sreenivas Rao et al., "Sensor Guided Docking of Autonomous Mobile Robot for Battery Recharging," International Journal of Recent Technology and Engineering (IJRTE), vol. 8, Issue: 4, https://www.ijrte.org/wp-content/uploads/papers/v8i4/D8176118419.pdf.

(Continued)

*Primary Examiner* — Thien M Le
*Assistant Examiner* — Asifa Habib
(74) *Attorney, Agent, or Firm* — Finnegan, Henderson, Farabow, Garrett & Dunner, LLP

(57) ABSTRACT

The present disclosure describes an automated docking system for charging chargeable mobile devices. Conventionally, docking systems utilize expensive technology like wireless charging leading to higher cost. The system of the present disclosure provides a cost effective generic docking station with internet of things (IoT) interface for heterogeneous chargeable mobile devices which leads to precise docking. The generic design of the docking station enables docking different category of the chargeable mobile devices such as fork type, unit load type, at same docking station with different charging currents. IoT enabled docking station communicates with the chargeable mobile devices and charges them based on battery health, quick/slow charge, category, task duration and/or the like. The present disclosure brings a design flexibility to the docking station and contact pads, so that the flexible design adjusts itself in (Continued)

translation and rotation axis for certain degrees of freedom if there is an error in docking.

7 Claims, 13 Drawing Sheets

(58) Field of Classification Search
CPC .......... B60L 53/22; B60L 53/36; B60L 53/31; B60L 53/35; B60L 53/16; H01R 13/6315
See application file for complete search history.

(56) References Cited

U.S. PATENT DOCUMENTS

| | | | | |
|---|---|---|---|---|
| 2014/0217977 | A1* | 8/2014 | Pastoor | B60L 53/36 320/109 |
| 2015/0191094 | A1* | 7/2015 | Maekawa | H02J 50/90 307/104 |
| 2016/0023565 | A1* | 1/2016 | Bell | B60L 53/14 320/108 |
| 2017/0001524 | A1* | 1/2017 | Vahle | B66C 13/12 |
| 2017/0327091 | A1* | 11/2017 | Capizzo | B60L 53/14 |
| 2020/0021122 | A1* | 1/2020 | Lydon | H02J 7/70 |
| 2020/0133287 | A1* | 4/2020 | Wendeborn | B60L 53/30 |
| 2022/0219557 | A1* | 7/2022 | Poluboiarinov | B25J 11/00 |
| 2023/0029165 | A1* | 1/2023 | Li | A47L 11/4088 |
| 2024/0030728 | A1* | 1/2024 | Chintalapalli Patta | A47L 9/2873 |
| 2024/0253502 | A1* | 8/2024 | Poluboiarinov | B25J 11/00 |
| 2025/0079857 | A1* | 3/2025 | Jang | H01M 10/46 |

OTHER PUBLICATIONS

Haiyuan Li et al., "Design and Experiments of a Compact Self-Assembling Mobile Modular Robot with Joint Actuation and Onboard Visual-Based Perception," Applied Sciences, 2022, vol. 12, Issue: 6, MDPI, https://www.mdpi.com/2076-3417/12/6/3050.

S Vongbunyong et al. "Automatic precision docking for autonomous mobile robot in hospital logistics—case-study: battery charging," IOP Conf. Series: Materials Science and Engineering, 2021, vol. 12; Issue: 6, IOP Publishing, https://iopscience.iop.org/article/10.1088/1757-899X/1137/1/012060/pdf.

* cited by examiner

AUTOMATED DOCKING SYSTEM FOR CHARGING CHARGEABLE MOBILE DEVICES

PRIORITY CLAIM

This U.S. patent application claims priority under 35 U.S.C. § 119 to: India Application No. 202221041399, filed on Jul. 19, 2022. The entire contents of the aforementioned application are incorporated herein by reference.

TECHNICAL FIELD

The disclosure herein generally relates to a docking system, and, more particularly, to automated docking system for charging chargeable mobile devices.

BACKGROUND

With advancement in programming technology, programmable electronic devices are becoming more prevalent and are used to perform multiple tasks that are time consuming. Many of such programmable electronic devices are chargeable mobile devices such as autonomous mobile robots. These chargeable mobile devices require regular charging to keep them operational. The charging or docking process could be manual or automated. For automated charging, the chargeable mobile devices need a docking station. Generally, the docking station are idle devices with charging ports to which the chargeable mobile devices automatically get docked. However, conventionally, the chargeable mobile devices fail in docking themselves in a first attempt due to multiple reasons. These multiple reasons may include sensor noise, lack of mechanical flexibility in the docking stations, lack of features for a chargeable mobile device to automatically detect the docking stations, and/or the like. Further, conventional systems generally utilize expensive technology like wireless charging leading to higher cost.

SUMMARY

Embodiments of the present disclosure present technological improvements as solutions to one or more of the above-mentioned technical problems recognized by the inventors in conventional systems. For example, in one aspect, there is provided an automated docking system for charging a chargeable mobile device. The automated docking system comprising: a docking station, wherein the docking station comprises: a base assembly, wherein the base assembly comprises: a base plate, wherein the base plate comprises a first end, a second end, a plurality of mounting holes adapted for provisioning grouting and a plurality of mounting holes adapted for provisioning a battery charger mount plate, and wherein the first end of the base plate is connected to a first dead weight and the second end of the base plate is connected to a second dead weight; a rear plate coupled to the base plate through a plurality of coil springs, wherein each of the plurality of coil springs is adapted to provide a cushioning effect for the docking station during an autodocking process of the automated docking system for charging the chargeable mobile device; a floating assembly, wherein the floating assembly comprises: a rod housing, wherein the rod housing comprises a first side and a second side, and wherein each side of the rod housing comprises a set of holes; a floating plate, wherein the floating plate comprises a pair of flanges and a flat portion substantially protruding towards an angular assembly, wherein each flange of the pair of flanges comprises a corresponding hole; a first set of guide rods, wherein each guide rod of the first set of guide rods comprises a first end and a second end, and wherein each guide rod of the first set of guide rods is adapted to pass through a corresponding hole of the set of holes at a corresponding side of the rod housing, and each of the first end and the second end of each of the first set of guide rods is connected to a corresponding flange from the pair of flanges of the floating plate via one or more screws; a pair of stoppers, wherein each stopper from the pair of stoppers is connected to a corresponding side from the first side and the second side of the rod housing and is adapted to adjust a lateral stroke required for the auto docking process of the automated docking system; and a first set of tension springs inserted over the first set of guide rods and positioned between the rod housing and the pair of flanges of the floating plate, wherein the first set of tension springs is adapted to permit a lateral movement of the docking station from an initial position to a desired position during the autodocking process of the automated docking system for charging the chargeable mobile device; a center assembly, wherein the center assembly comprises: a mounting block having a plurality of holes; a second set of guide rods, wherein each guide rod of the second set of guide rods comprises a first end and a second end, and wherein the first end of each guide rod of the second set of guide rods is sliding inside a corresponding hole of the plurality of holes of the mounting block and connected with each other by a small plate and one or more screws, and the second end of each guide rod of the second set of guide rods is coupled to the rod housing; and a second set of tension springs inserted over the second set of guide rods and positioned between the rod housing and the mounting block, wherein the second set of tension springs is adapted to permit a longitudinal movement of the docking station from an initial position to a desired position during the autodocking process of the automated docking system for charging the chargeable mobile device; the angular assembly configured to provide an angular motion to the docking station during the autodocking process of the automated docking system for charging the chargeable mobile device; and a fleet management network comprising a plurality of the chargeable mobile devices to be charged at the docking station.

In accordance with an embodiment of the present disclosure, the angular assembly comprises: a table assembly mounted on the floating plate; a charging pad mounting plate, wherein the charging pad mounting plate comprises a top surface and a bottom surface; a charging pad, wherein the charging pad is coupled to the table assembly through the charging pad mounting plate; a plurality of standoffs, wherein each standoff from the plurality of standoffs comprises a first end and a second end, and wherein the first end of each standoff from the plurality of standoffs is connected to the charging pad mounting plate; a plurality of rollers, wherein each roller from the plurality of rollers is adapted to be connected to a corresponding second end of standoff from the plurality of standoffs via a screwing mechanism; a plurality of self-centering springs, wherein each self-centering spring from the plurality of self-centering springs comprises a first end and a second end, and wherein the first end of each self-centering spring from the plurality of self-centering springs is connected to a first set of pins mounted on the floating plate and the second end of each self-centering spring from the plurality of self-centering springs is connected to a second set of pins mounted on to the bottom surface of the charging pad mounting plate; a ball plunger, wherein the ball plunger comprises a first end and a second end, and wherein the first end of the ball plunger is adapted to be in contact with a hole made on the floating plate when the automated docking system is in an idle state and the second end of the ball plunger is mounted to the charging pad mounting plate; and a plurality of angle restrictors adapted to control the angular motion of the angular assembly, wherein the plurality of angle restrictors are mounted onto the floating plate and positioned adjacent to the ball plunger.

In accordance with an embodiment of the present disclosure, the automated docking system further comprises a housing cover enclosing the docking station and mounted to the base plate of the base assembly, wherein the housing cover comprises a plurality of patterns that enable the plurality of chargeable devices a position and orientation (pose) detection of the docking station.

In accordance with an embodiment of the present disclosure, the battery charger mount plate is adapted to hold a battery charger with help of a toggle clamp which is mounted onto the battery charger mount plate.

In accordance with an embodiment of the present disclosure, the table assembly is a turn table assembly.

In accordance with an embodiment of the present disclosure, the plurality of rollers are configured to guide docking element mounted to each of the plurality of chargeable devices.

In accordance with an embodiment of the present disclosure, the plurality of self-centering springs are configured to ensure keeping the angular assembly at center with help of the ball plunger.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
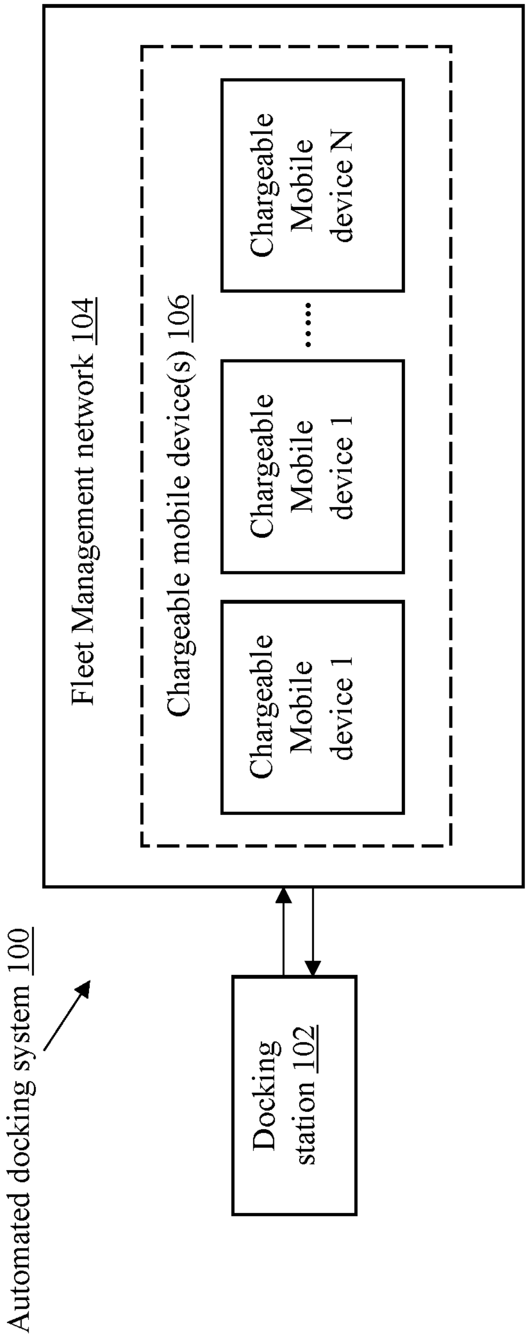
FIG. 1 depicts a block diagram of an automated docking system for charging chargeable mobile devices, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Programmable electronic devices are becoming more prevalent in many applications and are used to perform multiple tasks that are time consuming. Many of such programmable electronic devices are chargeable mobile devices such as autonomous mobile robots. These chargeable mobile devices require regular charging. The charging process could be manual or automated. For automated charging, the chargeable mobile devices need a docking station. Generally, the docking station are idle devices with charging ports to which the chargeable mobile devices automatically get dock. However, conventionally, the chargeable mobile devices fail in docking themselves in a first attempt due to multiple reasons. These multiple reasons may include sensor noise, lack of mechanical flexibility in the docking station, lack of features for a chargeable mobile device to automatically detect the docking station, and/or the like. Further, conventional systems generally utilize expensive technology like wireless charging leading to higher cost. The system of the present disclosure addresses the unresolved problem of automated docking in conventional docking systems by enabling precise docking of the chargeable mobile device and also making the docking station intelligent. This leads to the chargeable mobile devices to effectively communicate with the docking station and share data.

The system of the present disclosure provides a generic docking station with internet of things (IoT) interface for heterogeneous chargeable mobile devices. This means that design of the docking station is a generic design with robot sensor fusion which detects the docking station automatically and helps in precise docking. The generic design of the docking station enables docking different category of the chargeable mobile devices such as fork type, unit load type, and/or the like at same docking station with different charging currents. IoT enabled docking station communicates with the chargeable mobile devices and charges them based on battery health, quick/slow charge, category, task duration and/or the like. In other words, all the data connected over IoT is used for further processing to improve charging efficiency and task planning. In an embodiment, the present disclosure brings a design flexibility to the docking station and contact pads, so that the flexible design adjusts itself in translation and rotation axis for certain degrees of freedom if there is an error in docking.

Referring now to the drawings, and more particularly to FIGS. 1 through 13, where similar reference characters denote corresponding features consistently throughout the figures, there are shown preferred embodiments and these embodiments are described in the context of the following exemplary system and/or method.

Reference numerals of one or more components of the automated docking system 100 for charging a chargeable mobile device 106 as depicted in the FIGS. 1 through 12 are provided in Table 1 below for ease of description:

TABLE 1

| Sl. No | Component | Numeral reference |
|---|---|---|
| 1 | Automated docking system | 100 |
| 2 | Docking station | 102 |
| 3 | Fleet management network | 104 |
| 4 | Chargeable mobile device | 106 |
| 5 | Base assembly | 202 |
| 6 | Base plate | 402 |
| 7 | First end of base plate | 402 A |
| 8 | Second end of base plate | 402 B |
| 9 | Plurality of mounting holes for grouting | 404A |
| 10 | Plurality of mounting holes for battery charger mount plate | 404B |
| 11 | Battery charger mount plate | 502 |
| 12 | First dead weight | 406 |
| 13 | Second dead weight | 408 |
| 14 | Rear plate | 410 |
| 15 | Plurality of coil springs | 412 A-C |
| 16 | Floating assembly | 204 |
| 17 | Rod housing | 414 |
| 18 | First side of rod housing | 414 A |
| 19 | Second side of rod housing | 414 B |
| 20 | Set of holes on first side of rod housing | 602 A-C |
| 21 | Set of holes on second side of rod housing | 602 D-F |
| 22 | Floating plate | 416 |
| 23 | Pair of flanges | 418 A-B |
| 24 | Hole of pair of flanges | 702 A-D |
| 25 | First set of guide rods | 420 A-B |
| 26 | First end of the first set of guide rods | 902 A-B |
| 27 | Second end of the first set of guide rods | 904 A-B |
| 28 | Pair of stoppers | 422 A-B |
| 29 | First set of tension springs | 910 A-B |
| 30 | Center assembly | 206 |
| 31 | Mounting block | 302 |
| 32 | Small Plate | 816 |
| 33 | Plurality of holes of mounting block | 818 A-D |
| 34 | Second set of guide rods | 424 A-B |
| 35 | First end of the second set of guide rods | 802 A-B |
| 36 | Second end of the second set of guide rods | 804 A-B |
| 37 | Second set of tension springs | 810 A-B |
| 38 | Angular assembly | 208 |
| 39 | Table assembly | 504 |
| 40 | Charging pad mounting plate | 426 |
| 41 | Top surface of charging pad mounting plate | 426 A |
| 42 | Bottom surface of charging pad mounting plate | 426 B |

TABLE 1-continued

| Sl. No | Component | Numeral reference |
|---|---|---|
| 43 | Charging pad | 428 |
| 44 | Plurality of standoffs | 430 A-D |
| 45 | First end of standoff | 812 A-D |
| 46 | Second end of standoff | 814 A-D |
| 47 | Plurality of rollers | 432 A-D |
| 48 | Plurality of self-centering springs | 434 A-B |
| 49 | First end of self-centering spring | 806 A-B |
| 50 | Second end of self-centering spring | 808 A-B |
| 51 | First set of pins mounted on the floating plate | 906 A-B |
| 52 | Second set of pins mounted on to the bottom surface of the charging pad mounting plate | 1002 A-B |
| 53 | Ball plunger | 506 |
| 54 | First end of the ball plunger | 506 A |
| 55 | Second end of the ball plunger | 506 B |
| 56 | Hole made on the floating plate | 908 |
| 57 | Plurality of angle restrictors | 436 A-B |
| 58 | Housing cover | 508 |
| 60 | Plurality of patterns of the housing cover | 214 |
| 61 | Battery charger | 210 |
| 62 | Toggle clamp | 212 |
| 63 | Plurality of Rubber pads | 438 A-B |
| 64 | Memory | 1202 |
| 65 | One or more communication interfaces | 1204 |
| 66 | One or more hardware processors | 1206 |
| 67 | Database | 1208 |

Figure 2:
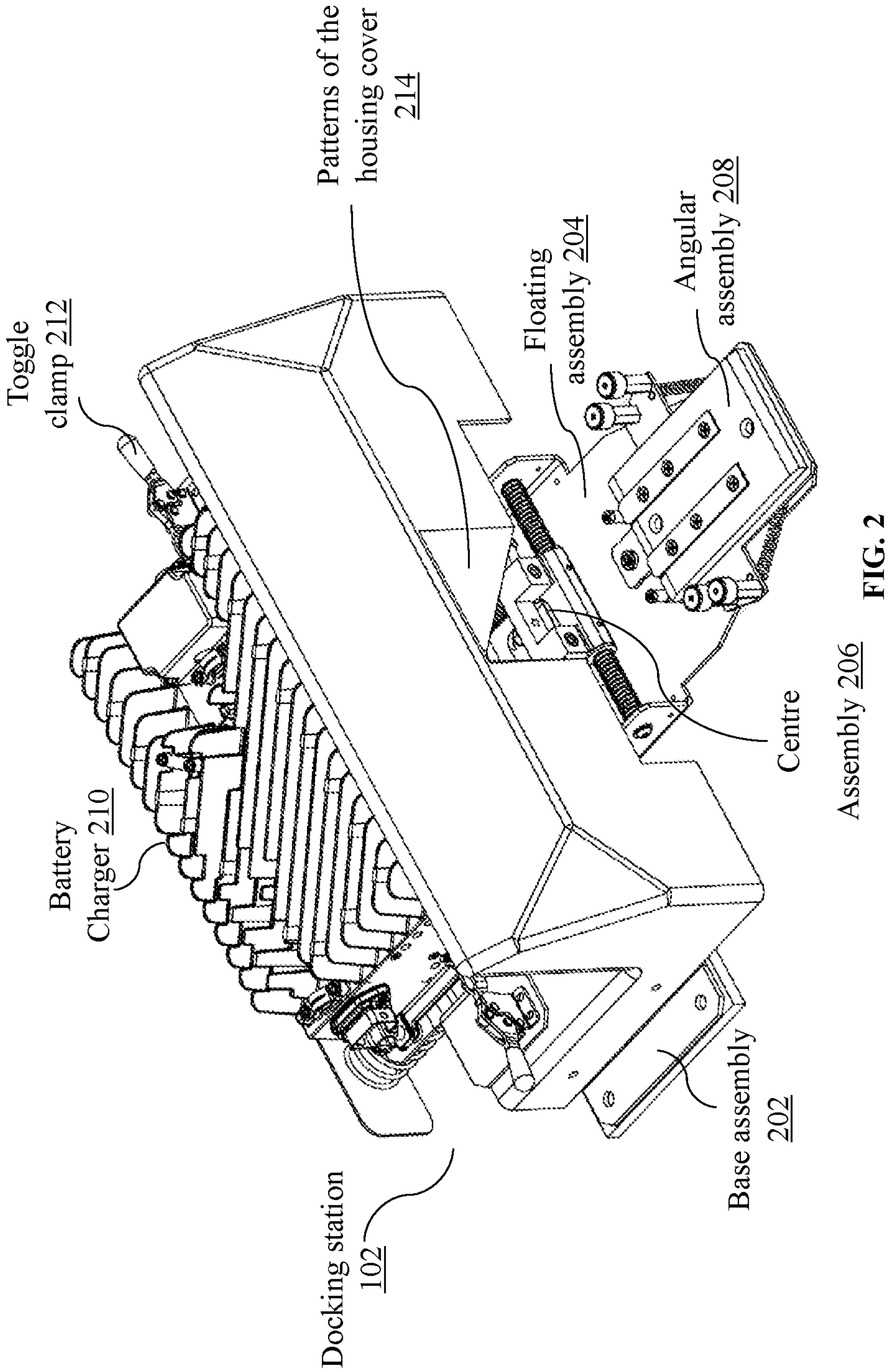
FIG. 2 depicts an isometric view of a docking station of the automated docking system for charging chargeable mobile devices, in accordance with an embodiment of the present disclosure.
Figure 3:
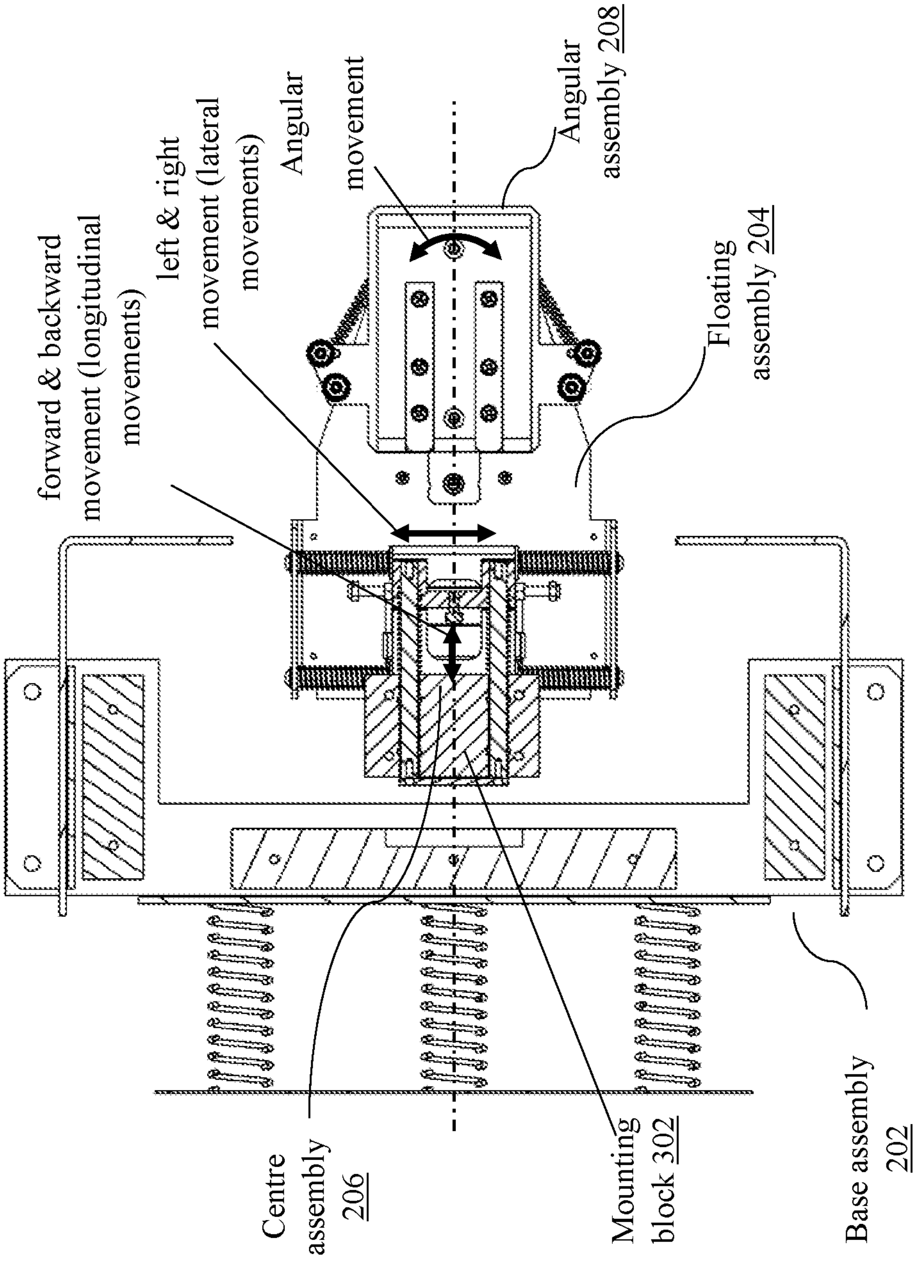
FIG. 3 depicts a cross-sectional top view of the docking station of the automated docking system for charging chargeable mobile devices, in accordance with an embodiment of the present disclosure.

FIG. 1 depicts a block diagram of an automated docking system 100 for charging chargeable mobile devices 106, in accordance with an embodiment of the present disclosure. In the present disclosure, the expressions 'charging' may be referred as 'docking' and may be interchangeably used hereinafter. The automated docking system 100 comprises a docking station 102. In an embodiment, the docking station 102 is a cost effective and IoT enabled generic docking station that communicates with the chargeable mobile devices 106 and charges them based on battery health, quick/slow charge, category, duration of tasks to be implemented, and/or the like. FIG. 2 depicts an isometric view of the docking station 102 of the automated docking system 100 for charging the chargeable mobile devices 106, in accordance with an embodiment of the present disclosure. FIG. 3 depicts a cross-sectional top view of the docking station of the automated docking system 100 for charging the chargeable mobile devices 106, in accordance with an embodiment of the present disclosure. In an embodiment, the present disclosure brings a design flexibility to the docking station 102 and a charging pad 428, so that the flexible design adjusts itself in translation and rotation axis for certain degrees of freedom if there is an error in docking. As shown in FIG. 2 and FIG. 3, the docking station 102 comprises a base assembly 202, a floating assembly 204, a center assembly 206, and an angular assembly 208. In an embodiment, the center assembly 206, floating assembly 204 and the angular assembly 208 work together during an autodocking process of the docking system 100.

Figure 4:
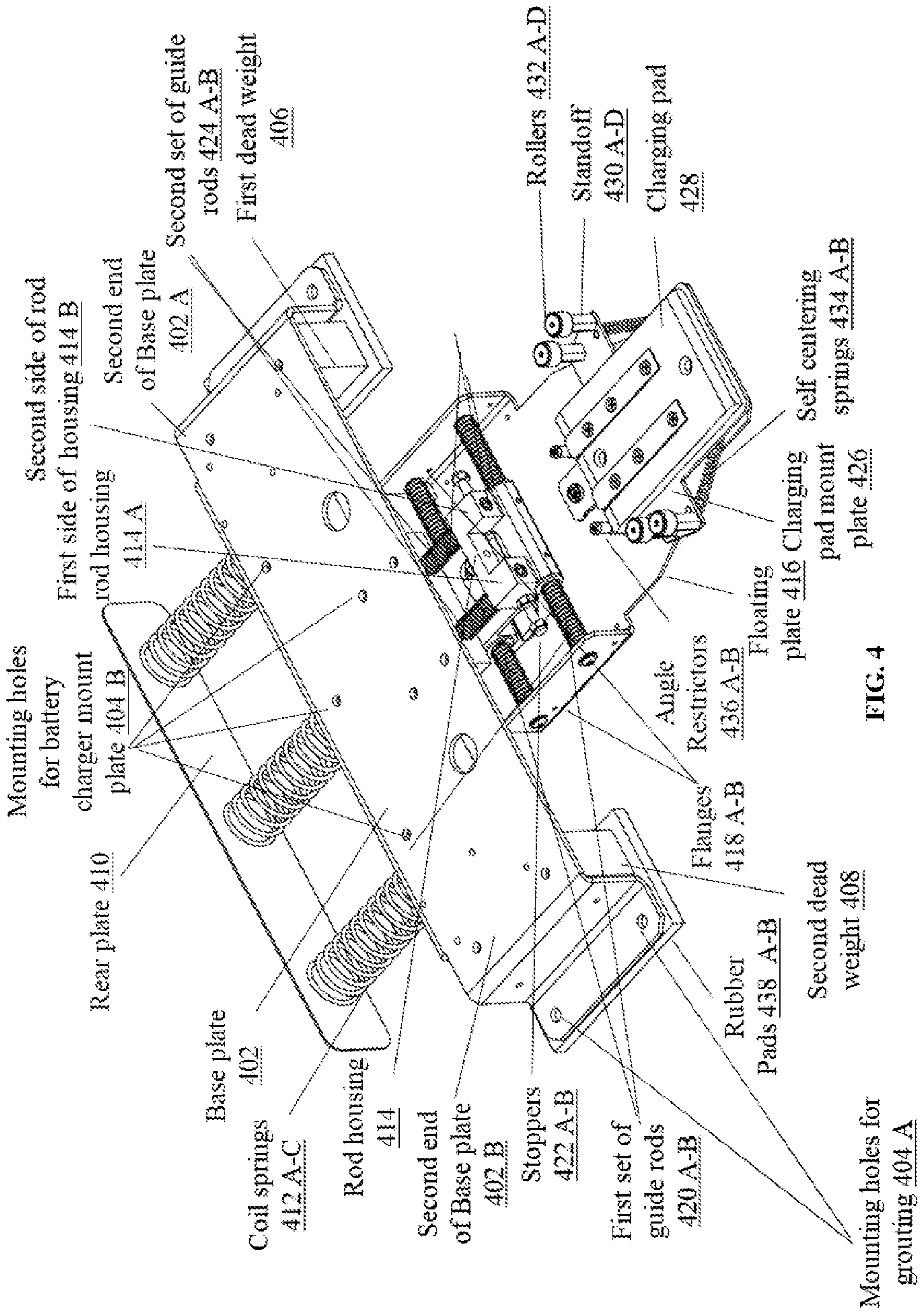
FIG. 4 depicts an isometric view of the docking station of the automated docking system for charging chargeable mobile devices without battery charger and a housing cover, in accordance with an embodiment of the present disclosure.

FIG. 4 depicts an isometric view of the docking station of the automated docking system 100 for charging the chargeable mobile devices 106 without battery charger 210 and a housing cover 508, in accordance with an embodiment of the present disclosure. As shown in FIG. 4, the base assembly 202 of the docking station 102 comprises a base plate 402 and a rear plate 410. The base plate 402 acts as main support plate of the automated docking system 100. The base plate 402 comprises a first end 402 A, a second end 402 B, a plurality of mounting holes 404 A adapted for provisioning grouting, and a plurality of mounting holes 404 B adapted for provisioning the battery charger mount plate 502. In an embodiment, the battery charger mount plate 502 is adapted to hold a battery charger 210 with help of a toggle clamp 212 which is mounted onto the battery charger mount plate 502. In other words, the battery charger mount plate 502 holds the battery charger 210 and the toggle clamp 212 together. In an embodiment, the first end 402 A of the base plate 402 is connected to a first dead weight 406 and the second end 402 B of the base plate 402 is connected to a second dead weight 408. In an embodiment, purpose of the first dead weight 406 and the second dead weight 408 is to secure position of docking station 102 during operations. The rear plate 410 is coupled to the base plate 402 through a plurality of coil springs 412 A-C. In an embodiment, each of the plurality of coil springs 412 A-C is adapted to provide a cushioning effect for the docking station 102 during an autodocking process of the automated docking system 100 for charging the chargeable mobile device 106. Generally, the chargeable mobile devices 106 possess certain speeds when they try to get dock. During the autodocking process, the docking station 102 gets affected by inertial forces by the chargeable mobile devices 102. The plurality of coil springs 412 A-C try to absorb such minor forces during the autodocking process. This is referred to as the cushioning effect. In other words, the plurality of coil springs 412 A-C and the rear plate 410 of base assembly 202 are used to provide additional cushioning effects for the whole docking station 102 when the chargeable mobile devices 106 (alternatively referred as mobile robots) are getting docked for charging. In an embodiment, as shown in FIG. 4, a plurality of rubber pads 438 A-B are kept underneath the base plate 402 while placing the docking station 102 onto ground (either with grouting or with dead weight). The plurality of rubber pads 438 A-B provide the cushioning effect or antivibration effect in case of grouting technique and frictional effect in case of dead weight type technique of placing of the docking station 102.

Figure 6:
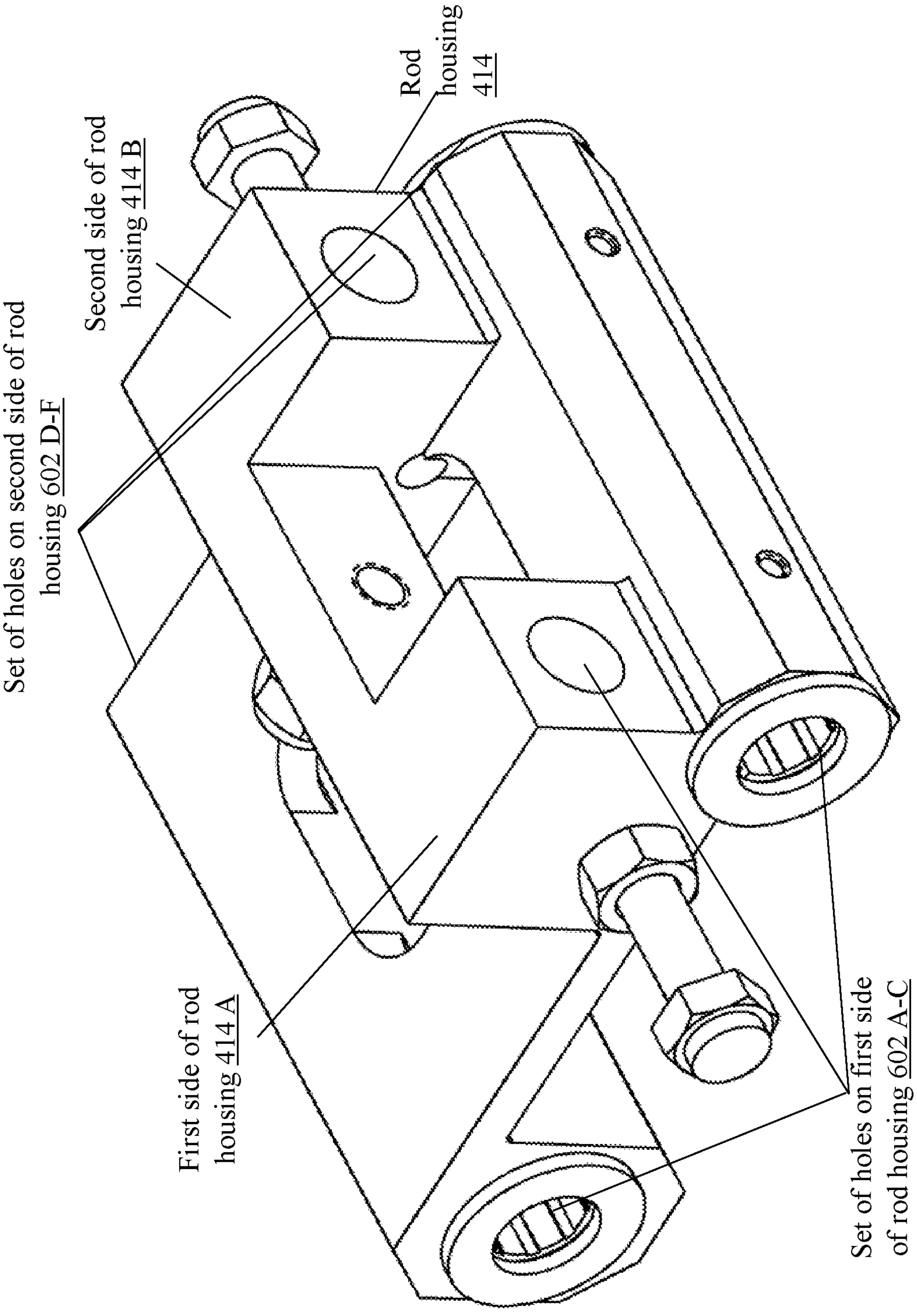
FIG. 6 depicts an isometric view of a rod housing of the automated docking system of FIG. 1, in accordance with an embodiment of the present disclosure.
Figure 7:
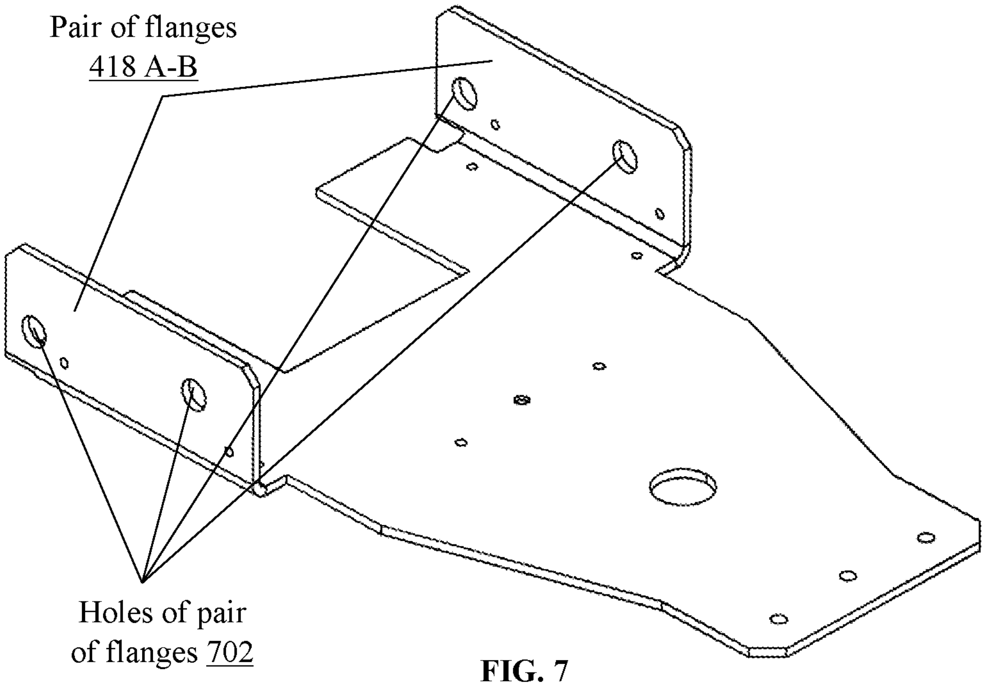
FIG. 7 depicts an isometric view of a floating plate of the automated docking system of FIG. 1, in accordance with an embodiment of the present disclosure.
Figure 8:
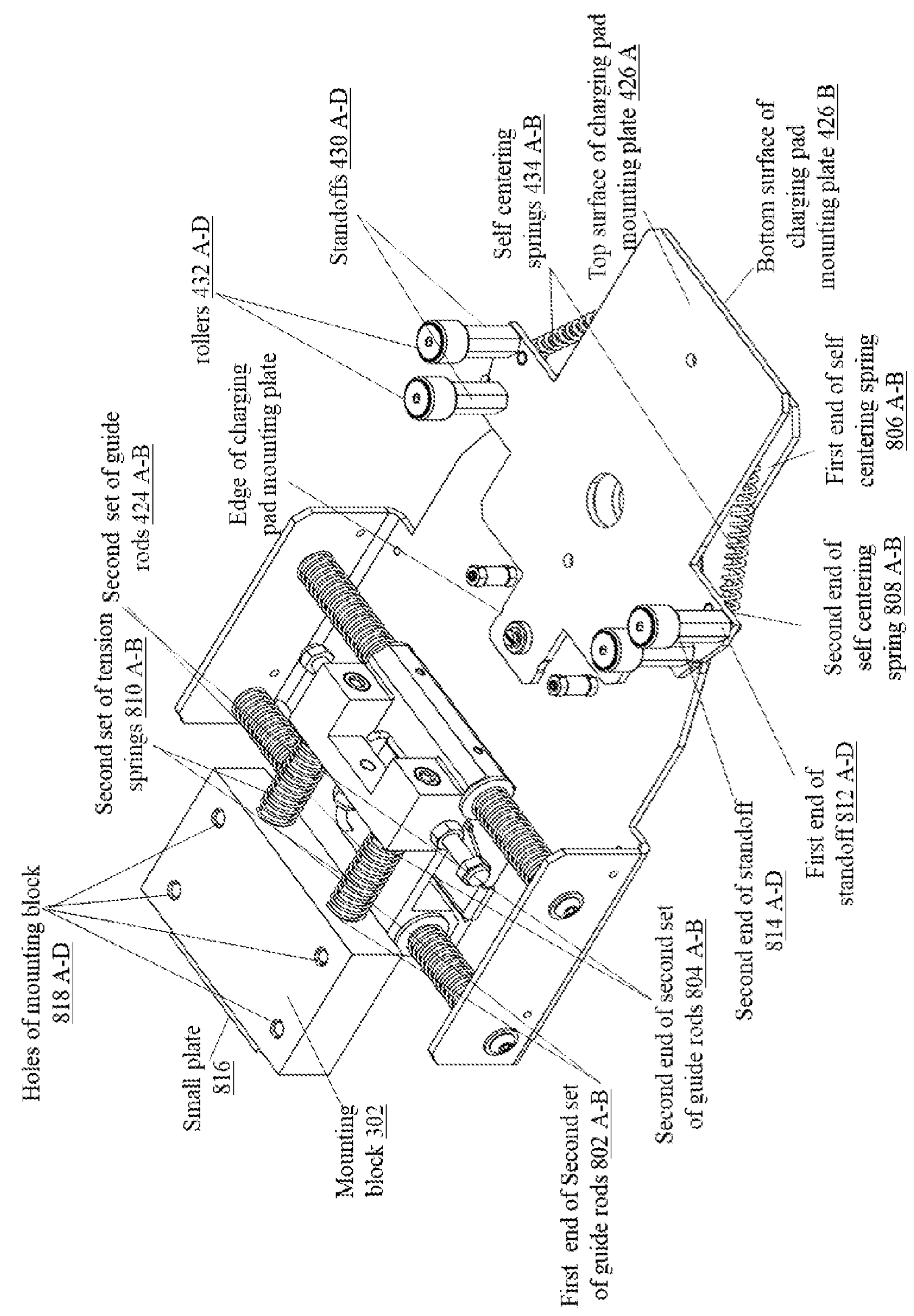
FIG. 8 depicts an isometric view of a floating assembly of the automated docking system of FIG. 1 excluding the rod housing, in accordance with an embodiment of the present disclosure.

The floating assembly 204 of the docking station 102 comprises a rod housing 414, a floating plate 416, a first set of guide rods 420 A-B, a pair of stoppers 422 A-B, and a first set of tension springs 910 A-B. FIG. 6 depicts an isometric view of the rod housing 414 of the automated docking system 100 of FIG. 1, in accordance with an embodiment of the present disclosure. As shown in FIG. 4 and FIG. 6, the rod housing 414 comprises a first side 414 A and a second side 414 B, and each side of the rod housing comprises a set of holes 602 A-F. FIG. 7 depicts an isometric view of the floating plate 416 of the automated docking system 100 of FIG. 1, in accordance with an embodiment of the present disclosure. As shown in FIG. 4 and FIG. 7, the floating plate 416 comprises a pair of flanges 418 A-B and a flat portion substantially protruding towards an angular assembly 208, wherein each flange of the pair of flanges 418 A-B comprises a corresponding hole. FIG. 8 depicts an isometric view of the floating assembly 204 of the automated docking system 100 of FIG. 1 excluding the rod housing, in accordance with an embodiment of the present disclosure. As shown in FIG. 8, each guide rod of the first set of guide rods 420 A-B comprises a first end 902 A-B and a second end 904 A-B and each guide rod of the first set of guide rods 420 A-B is adapted to pass through a corresponding hole of the set of holes at a corresponding side of the rod housing 414. Further, each of the first end 902 A-B and the second end 904 A-B of each of the first set of guide rods 420 A-B is connected to a corresponding flange from the pair of flanges 418 A-B of the floating plate 416 via one or more screws. In other words, the first set of guide rods 420 A-B are inserted into the holes provided to the rod housing 414. Both end of the first set of guide rods 420 A-B are screwed to flange end of the floating plate 416 whereas flat end of the floating plate 416 is provided for a charging pad 428.

As shown in FIG. 4, the floating assembly 204 comprises the pair of stoppers 422 A-B. Each stopper from the pair of stoppers 422 A-B is connected to a corresponding side from the first side 414 A and the second side 414 B of the rod housing 414 and is adapted to adjust a lateral stroke required for the auto docking process of the automated docking system 100. In an embodiment, the lateral stroke may vary up to 45 mm and depending on design and requirement. In the present disclosure, the lateral stroke is kept as 30 mm stroke at each side of the floating assembly 204 assuming that lateral accuracy of the chargeable mobile devices 106 is within 30 mm. So, the stroke is required to be changed, it is done by simply adjusting nuts of a corresponding stopper and the stroke is fixed. Further, as shown in FIG. 4, the floating assembly 204 comprises the first set of tension springs 910 A-B which are inserted over the first set of guide rods 420 A-B and positioned between the rod housing 414 and the pair of flanges 418 A-B of the floating plate 416. The first set of tension springs 910 A-B is adapted to permit a lateral movement of the docking station 102 from an initial position to a desired position during the autodocking process of the automated docking system 100 for charging the chargeable mobile device 106. In other words, use of the first set of tension springs 910 A-B on both sides is to always retain position of the rod housing 414 at center when the docking station 102 is not in operation. When the chargeable mobile device 106 (say mobile robot) tries to get dock, the first set of tension springs 910 A-B allows the docking station 102 to move laterally in certain stroke fixed by a stopper mechanism. As shown in FIG. 3, the first set of tension springs 910 A-B helps in a left and right movement of the docking station 102.

Figure 9:
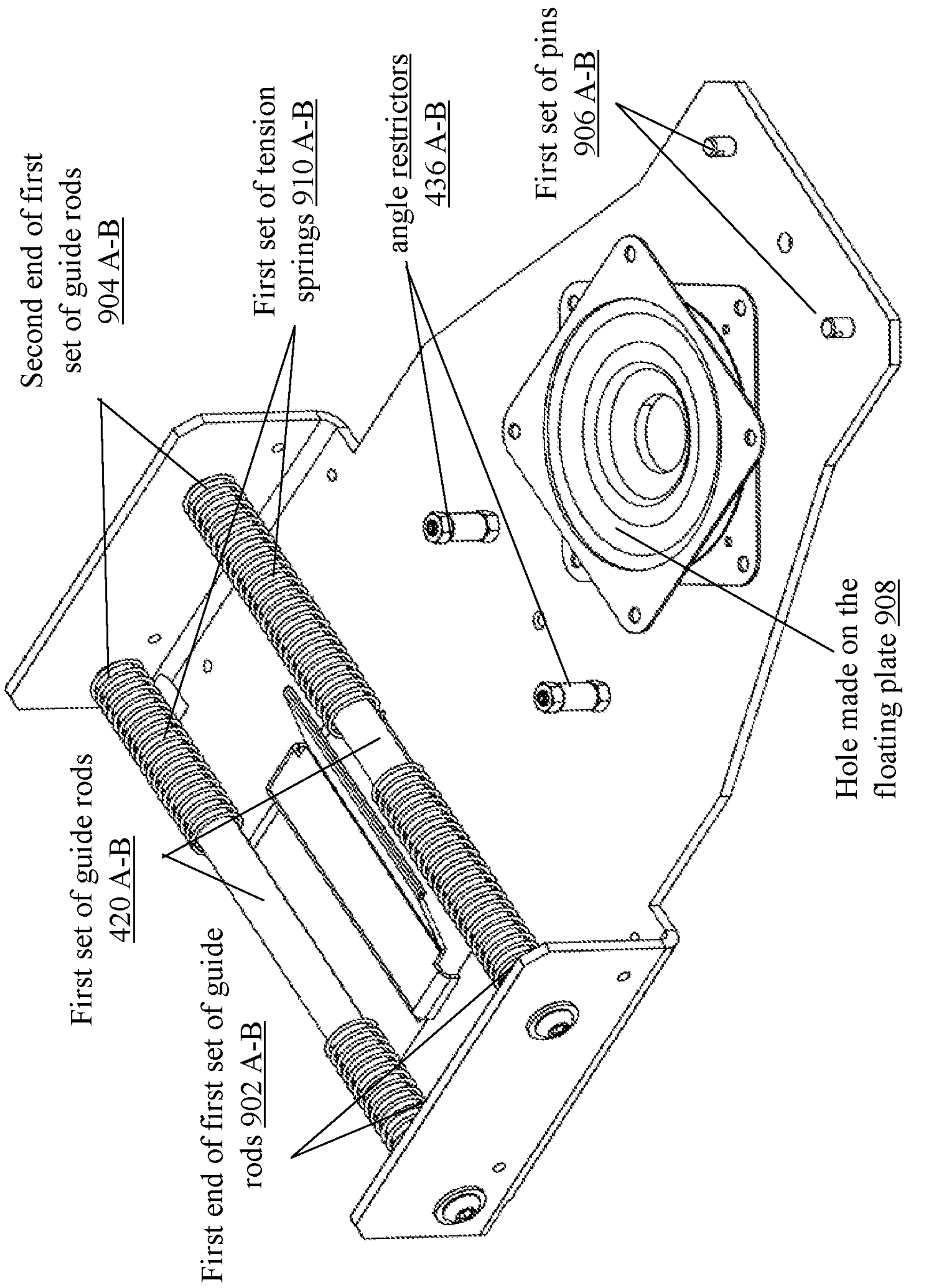
FIG. 9 depicts an inner view of the docking station of the automated docking system for charging chargeable mobile devices, in accordance with an embodiment of the present disclosure.

The center assembly 206 of the docking station 102 comprises a mounting block 302, a second set of guide rods 424 A-B, and a second set of tension springs 810 A-B. The mounting block 302 of the center assembly 206 comprises a plurality of holes 818 A-D. FIG. 9. depicts an inner view of the docking station of the automated docking system for charging chargeable mobile devices, in accordance with an embodiment of the present disclosure. It is shown in FIG. 8 that each guide rod of the second set of guide rods 424 A-B of the center assembly 206 comprises a first end 802 A-B and a second end 804 A-B. As shown in FIG. 4, the first end 802 A-B of each guide rod of the second set of guide rods 424 A-B is sliding inside a corresponding hole of the plurality of holes 818 A-D of the mounting block 302 and connected with each other by a small plate 816 and one or more screws. The second end 804 A-B of each guide rod of the second set of guide rods 424 A-B is coupled to the rod housing 414.

The second set of tension springs 810 A-B of the center assembly 206 is inserted over the second set of guide rods 424 A-B and positioned between the rod housing 414 and the mounting block 302. In an embodiment, the second set of tension springs 810 A-B is adapted to permit a longitudinal movement of the docking station 102 from an initial position to a desired position during the autodocking process of the automated docking system 100 for charging the chargeable mobile device 106. In other words, use of the second set of tension springs 810 A-B on the second set of guide rods 424 A-B is to always retain the position of the rod housing 414 at a specific position when the docking station 102 is not in operation. When the chargeable mobile device (say mobile robot) tries to get dock, the second set of tension springs 810

A-B allows the docking station 102 to move longitudinally in certain stroke fixed by the stopper mechanism. As shown in FIG. 3, the second set of tension springs 810 A-B helps in a forward and backward movement of the docking station 102. The center assembly 206 of the of the docking station 102 provides a flexible cushioning for translation.

The angular assembly 208 of the docking station 102 is configured to provide an angular motion to the docking station 102 during the autodocking process of the automated docking system 100 for charging the chargeable mobile device 106. The angular assembly comprises a turn table assembly 504 mounted on the floating plate 416, a charging pad mounting plate 426, a charging pad 428, a plurality of standoffs 430 A-D, a plurality of rollers 432 A-D, a plurality of self-centering springs 434 A-B, a ball plunger 506, and a plurality of angle restrictors 436 A-B. In an embodiment, the table assembly 504 of the angular assembly 208 is a turn table assembly. The turn table assembly 504 is mounted to the floating plate 416 on which the charging pad 428 is mounted with help of the charging pad mount plate 426. The charging pad mounting plate 426 of the angular assembly 208 comprises a top surface 426 A and a bottom surface 426 B. The charging pad 428 is coupled to the table assembly 504 through the charging pad mounting plate 426. As shown in FIG. 4, each standoff from the plurality of standoffs 430 A-D of the angular assembly 208 comprises a first end 812 A-D and a second end 814 A-D. The first end 812 A-D of each standoff from the plurality of standoffs 430 A-D is connected to the charging pad mounting plate 426. In an embodiment, the plurality of rollers 432 A-D of the angular assembly 208 are configured to guide docking element (not shown) mounted to each of the plurality of chargeable devices 106. In an embodiment, the docking element is a part of the chargeable mobile device 106 which comes and gets connected to the charging pad 428 of the docking station 102 for charging the chargeable mobile device 106. Further, it is shown in FIG. 4 that each roller from the plurality of rollers 432 A-D of the angular assembly 208 is adapted to be connected to a corresponding second end of standoff from the plurality of standoffs 430 A-D via a screwing mechanism.

Further, the angular assembly 208 comprises the plurality of self-centering springs 434 A-B. In an embodiment, each self-centering spring from the plurality of self-centering springs 434 A-B comprises a first end 806 A-B and a second end 808 A-B. The first end 806 A-B of each self-centering spring from the plurality of self-centering springs 434 A-B is connected to a first set of pins 906 A-B mounted on the floating plate 416 and the second end 808 A-B of each self-centering spring from the plurality of self-centering springs 434 A-B is connected to a second set of pins 1002 A-B mounted on to the bottom surface 426 B of the charging pad mounting plate 426. In an embodiment, the ball plunger 506 of the angular assembly 208 comprises a first end 506 A and a second end 506 B. The first end 506 A of the ball plunger 506 represents a ball and is adapted to be in contact with a hole 908 made on the floating plate 416 when the automated docking system 100 is in an idle state and the second end 506 B of ball plunger 506 is mounted to the charging pad mounting plate 426. In an embodiment, the plurality of self-centering springs 434 A-B are configured to ensure keeping the angular assembly 208 at center with help of the ball plunger 506. The angular assembly 208 also comprises the plurality of angle restrictors 436 A-B which are mounted onto the floating plate 416 and positioned adjacent to the ball plunger 506. In an embodiment, the plurality of angle restrictors 436 A-B of the angular assembly 208 are adapted to control the angular motion of the angular assembly 208. As shown in FIG. 8, when the angular assembly 208 is moved by? a specific degree, then edge of the charging pad mounting plate 426 is collided with the plurality of angle restrictors 436 A-B resulting in a restricted and controlled motion of the angular assembly 208.

Figure 5:
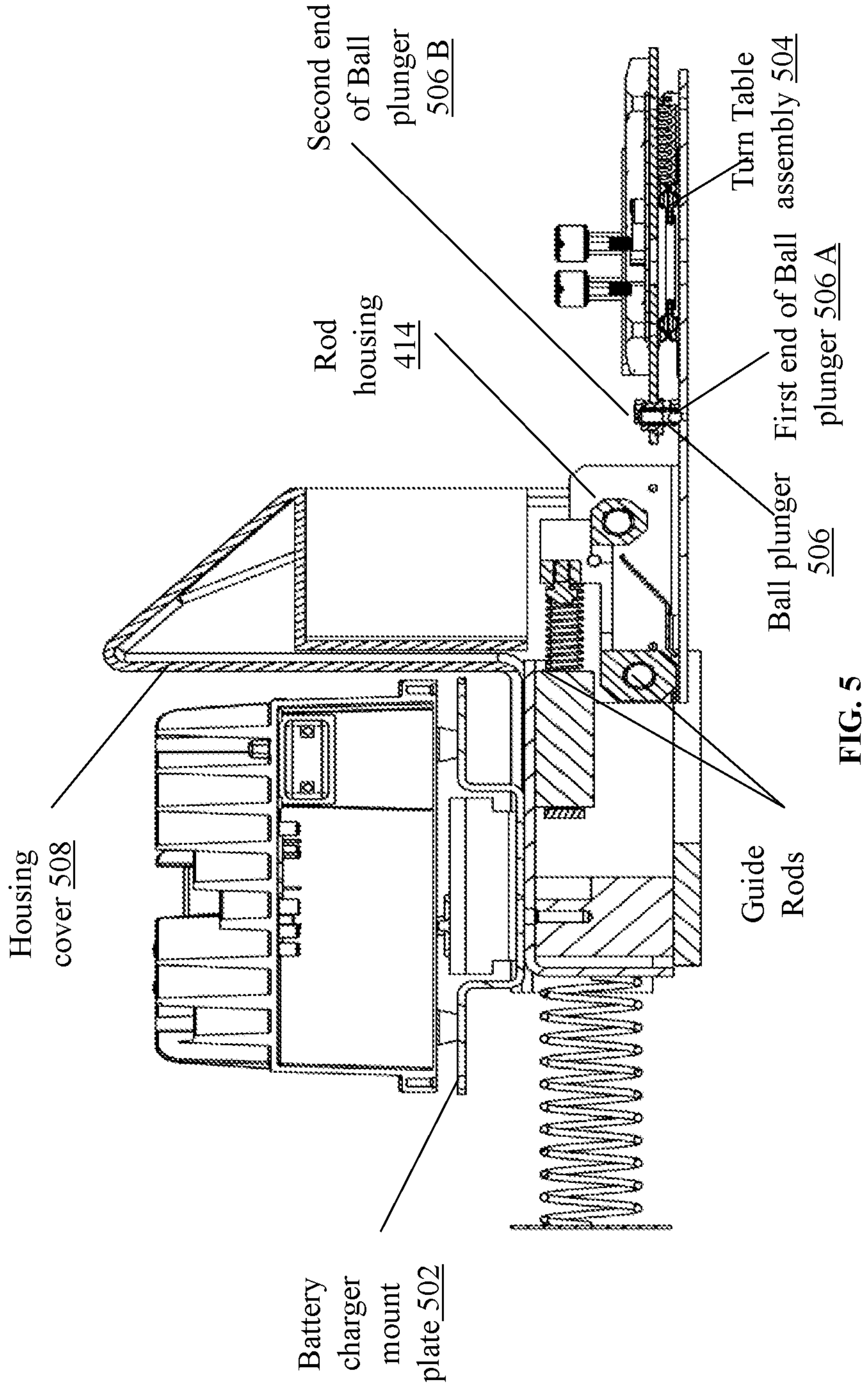
FIG. 5 depicts a cross-sectional side view of the docking station of the automated docking system for charging chargeable mobile devices with battery charger, in accordance with an embodiment of the present disclosure.

FIG. 5 depicts a cross-sectional side view of the docking station 102 of the automated docking system 100 for charging the chargeable mobile devices 106 with battery charger 210, in accordance with an embodiment of the present disclosure. It is shown in FIG. 5 that the automated docking system 100 comprises the housing cover 508 enclosing the docking station 102 and mounted to the base plate 402 of the base assembly 202. The housing cover 508 comprises a plurality of patterns 214 that enable the plurality of chargeable devices 106 a position and orientation (pose) detection of the docking station 102. In the present disclosure, the plurality of patterns 214 of the housing cover 508 could be of different complex shapes, size, type, length, and orientation. For example, the plurality of patterns 214 of the housing cover 508 can V-shaped, L-shaped, and/or the like. However, in the present disclosure, V-shaped patterns are created on the housing cover 508 so that it helps the chargeable mobile devices 106 to detect the pose of the docking station 102.

Figure 10:
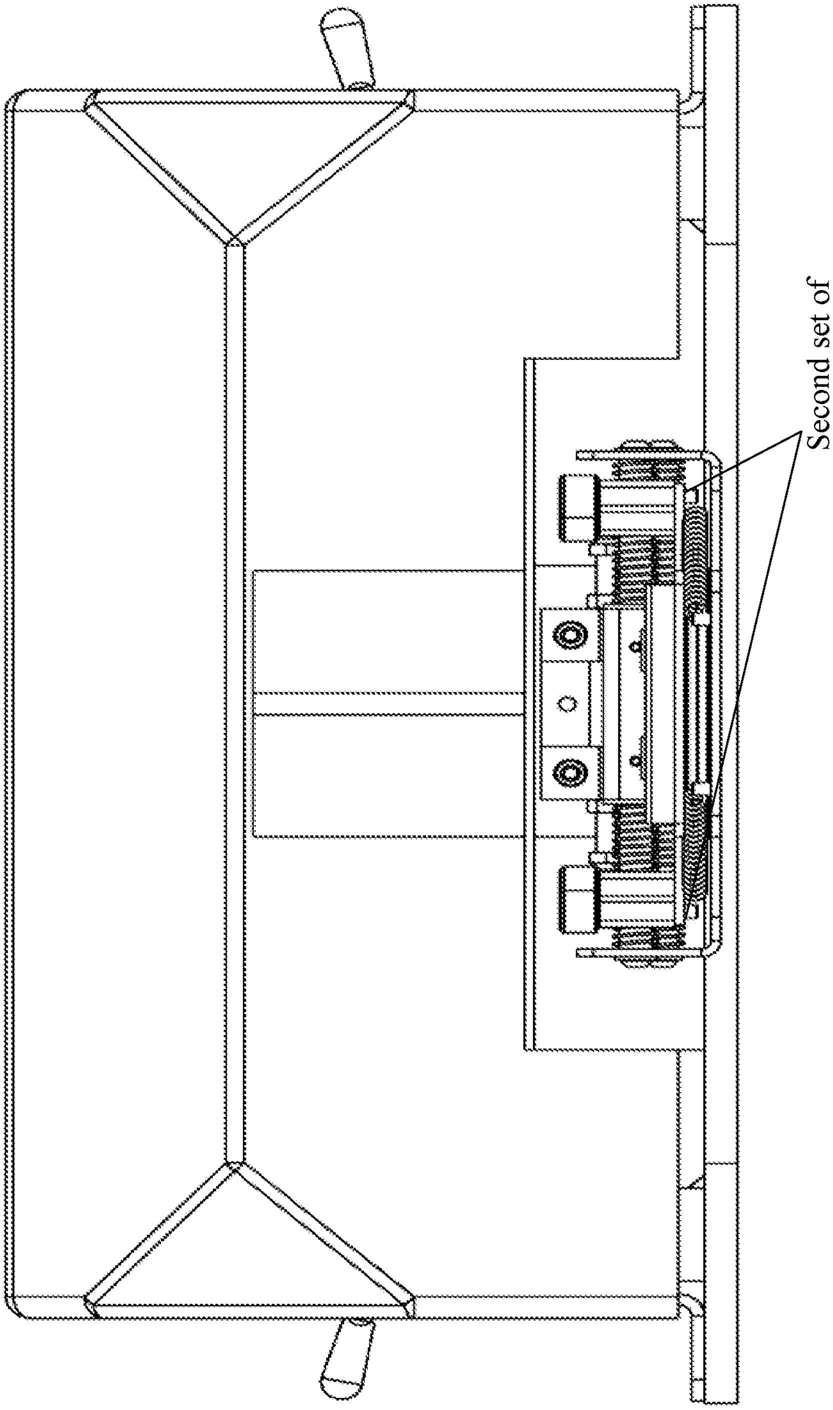
FIG. 10 depicts a front view of the docking station of the automated docking system for charging chargeable mobile devices, in accordance with an embodiment of the present disclosure.

FIG. 10 depicts a front view of the docking station 102 of the automated docking system 100 for charging the chargeable mobile devices 106, in accordance with an embodiment of the present disclosure.

Figure 11:
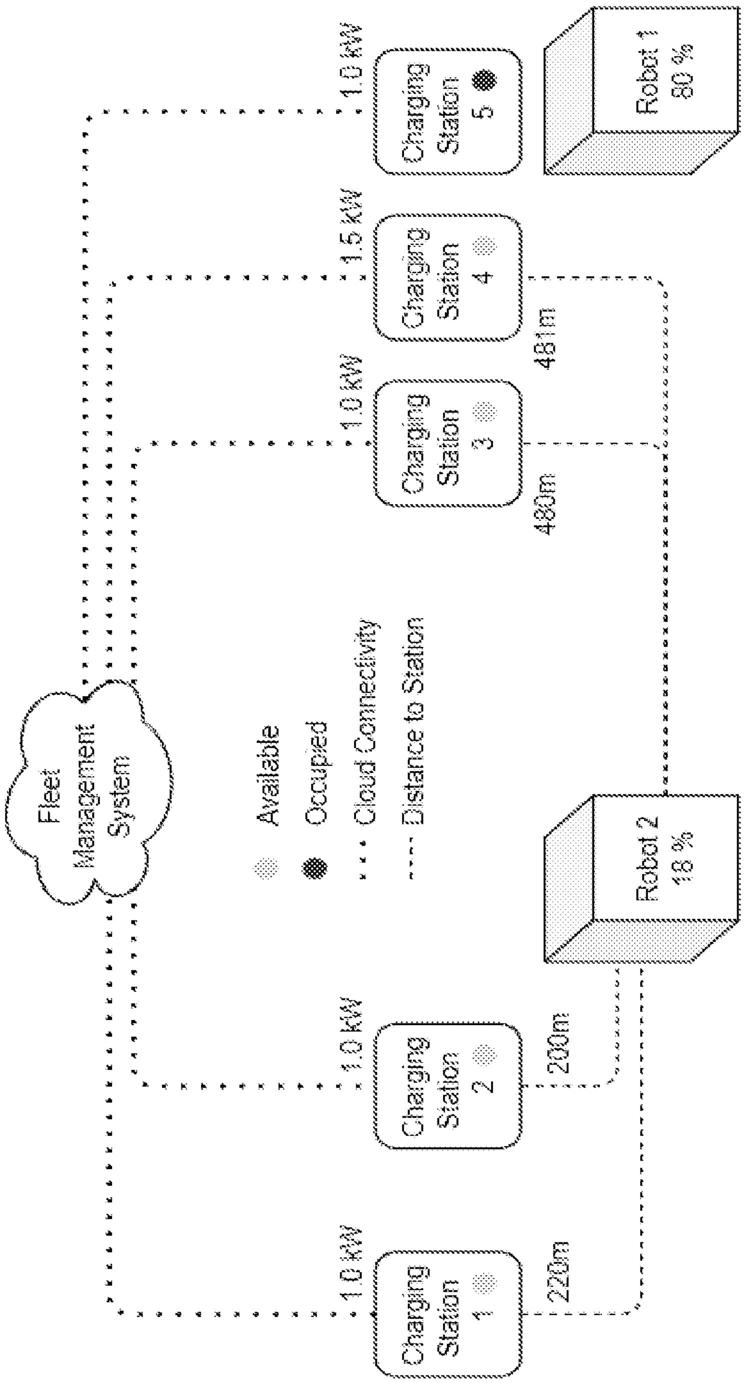
FIG. 11 depicts a functional diagram of a fleet management network of the automated docking system for charging chargeable mobile devices (robot), in accordance with an embodiment of the present disclosure.

FIG. 11 depicts a functional diagram of a fleet management network 104 of the automated docking system 100 for charging the chargeable mobile devices 106, in accordance with an embodiment of the present disclosure. In an embodiment, the automated docking system 100 comprises the fleet management network 104. In the context of the present discourse, the expressions 'fleet management network' may be referred to as 'fleet management system' and may be interchangeably used hereinafter. The fleet management network 104 comprises a plurality of the chargeable mobile devices 106 to be charged at the docking station 102. In an embodiment, the chargeable mobile devices 106 may include but not limited to a robot, a vehicle, a machine, and/or the like. In an embodiment, a fleet of chargers are integrated to the fleet management system (FMS) 104, which is able to monitor and adjust power delivered to the chargeable mobile devices 106 efficiently, in order to increase lifetime of battery. As shown in FIG. 7, through the fleet management network 104, the chargeable mobile devices 106 are able to understand unoccupied charging stations, power capability, and their location.

Most of the docking stations are design for automation. As per the requirement by automation system, to bring design flexibility to the docking station 102 and to the charging pad 428, the floating assembly 204 which is connected to the base assembly 202 inside the docking station 102 is designed to provide flexible cushioning for translation using the center assembly 206 and rotation using the angular assembly 208. Rotation flexibility through the angular assembly 208 is achieved through the plurality of self-centering springs 434 A-B which are connected to the charging pad mount plate 426 and the floating plate 416 with help of the first set of pins 906 A-B and the second set of pins 1002 A-B. To this assembly, the charging pad 428 is connected. When the chargeable mobile device 106 comes to automatically dock, a slight translation and rotational error can be expected. In the present disclosure, the base assembly

202 of the docking station 102 aligns itself to get better contact with pads (not shown) on the chargeable mobile device 106.

The automated docking station 100 can be used for charging the chargeable mobile devices 106. One or more sensors comprising a 2D sensor, a 3D sensor or a combination of 2D and 3D sensors (3D+2D) are integrated with the automated docking system 100 which capture information to identify a docking station from a plurality of docking stations 102 in a predefined region and to estimate the position and orientation of the identified docking station. In an embodiment, the one or more sensors may include vision sensors, LIDAR, and other onboarding sensors. In the present disclosure, the one or more sensors are not visible and not depicted in the FIGS. In an embodiment, expression 'vision sensors' may be referred as 'cameras' or 'image capturing device' or 'video capturing device' or 'electronic device' and may be interchangeably used hereinafter. In an embodiment, the captured information comprises reflection pattern intensity of the docking station 102 obtained using the LIDAR sensors, unique V-shape patterns created on the housing cover 508, a plurality of visual fiducial markers, a combination of 2D and 3D markers. In an embodiment, the 3D marker can have shapes varying from a simple wedge design to predefined patterns, which is uniquely distinguishable from 3D data captured from a 3D camera (not shown) mounted on the chargeable mobile device 106. In an embodiment of the present disclosure, the vision sensor is an electronic device that captures information using a two-dimensional (2D) RGBD camera for identifying the plurality of visual fiducial markers such as April tag. The captured information is fed to sensor fusion where the captured information is fused with corresponding weights to estimate perfect pose for the chargeable mobile device 106 to dock it in global coordinate frame.

Further, the automated docking system 100 is backed by artificial intelligence-based system (e.g., one or more hardware processors 104) which helps in precise docking thereby improving charging efficiency and task planning. In an embodiment, the vision sensors are connected to (or are an integral part of) an external system (e.g., a robot wherein the automated docking system 100 is connected to this system for passing the captured information by the robot to the automated docking system 100 for charging the robot). The automated docking system 100 can handle different category of chargeable mobile devices 106 such as fork type, unit load type, and/or the like at same docking station with different charging currents and can be controlled independently. The docking stations 102 can be scanned via a sensor array for position and orientation. Based on information, the automated docking station 100 utilizes an artificial intelligence-based hardware processor (e.g., wherein the artificial intelligence-based hardware processor is either an integral part of the apparatus 100 or externally connected to the automated docking system 100 via input/output communication interfaces as known in the art) that makes the chargeable mobile devices 106 to dock with ease and effective based on the flexibility provided by the autodocking process of the automated docking system 100 in lateral, longitudinal and angular direction.

Figure 12:
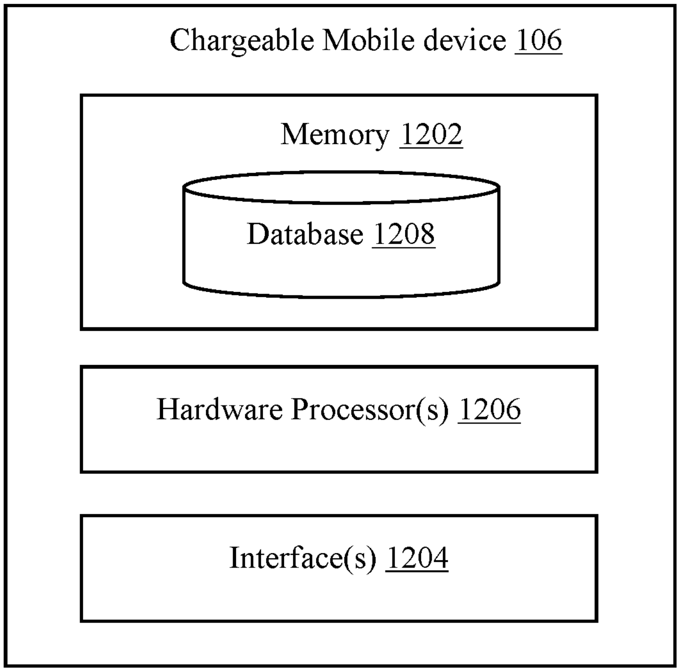
FIG. 12 depicts a functional block diagram of a chargeable mobile device associated with fleet management network of the automated docking system, in accordance with an embodiment of the present disclosure.

FIG. 12 depicts a functional block diagram of a chargeable mobile device 106 associated with the fleet management network 104 of the automated docking system 100, in accordance with an embodiment of the present disclosure.

In an embodiment, the chargeable mobile device 106 includes one or more hardware processors 1206, communication interface device(s) or input/output (I/O) interface(s) 1204 (also referred as interface(s)), and one or more data storage devices or memory 1202 operatively coupled to the one or more hardware processors 1206. The one or more processors 1206 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the chargeable mobile device 106 can be implemented in a variety of computing systems, such as laptop computers, notebooks, hand-held devices, workstations, mainframe computers, servers, a network cloud, robot, and the like.

The I/O interface device(s) 1204 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) 1204 can include one or more ports for connecting a number of devices to one another or to another server.

The automated docking system 100 may be equipped with a 2D and/or a 3D camera (also referred as an electronic device) which provides information the plurality of visual fiducial markers, a combination of 2D and 3D markers to the automated docking system 100, wherein the docking system 100 enables identification of available charging stations and pose estimation the identified charging stations for charging the chargeable mobile devices 106.

The memory 1202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 1208 is comprised in the memory 1202, wherein the database 1208 comprises information, for example, charging status of the chargeable mobile devices 106, unoccupied charging stations, power capability, and their location. The information stored in the database 1208 may further comprise position and estimation of docking stations estimated by the automated docking system 100 or the hardware processors 1206. The information stored in the database 1208 may further comprise information captured by the LIDAR sensors, vision sensors, shape patterns created on the housing cover 508, and/or the like. The memory 1202 further comprises (or may further comprise) information pertaining to input(s)/output(s) of each step performed by the systems and methods of the present disclosure. In other words, input(s) fed at each step and output(s) generated at each step are comprised in the memory 1202 and can be utilized in further processing and analysis.

In an embodiment, the automated docking system 100 is connected to the chargeable mobile devices 106 or an external system via one or more coupling systems (e.g., wired connectors as known in the art or wireless systems) or input/output interfaces as known in the art. The chargeable mobile device 106 comprises (or may comprise) the components as shown in FIG. 8, wherein the chargeable mobile device 106 or external system receives information being captured by the electronic device. In an embodiment, the electronic device may be comprised in the external system or the chargeable mobile device 106. The same information is processed by one or more hardware processors 1206 which estimate position and orientation of the docking station. The same information is processed by the one or more hardware processors 1206 that enables the chargeable mobile devices 106 to automatically dock, based on the captured information. In an embodiment, the chargeable mobile device 106 may be comprised within (or integrated inside) the automated docking system 100. In another embodiment, the chargeable mobile device 106 may be externally connected to the automated docking system 100 via one or more interfaces/coupling mechanism/connectivity means, etc.

Figure 13:
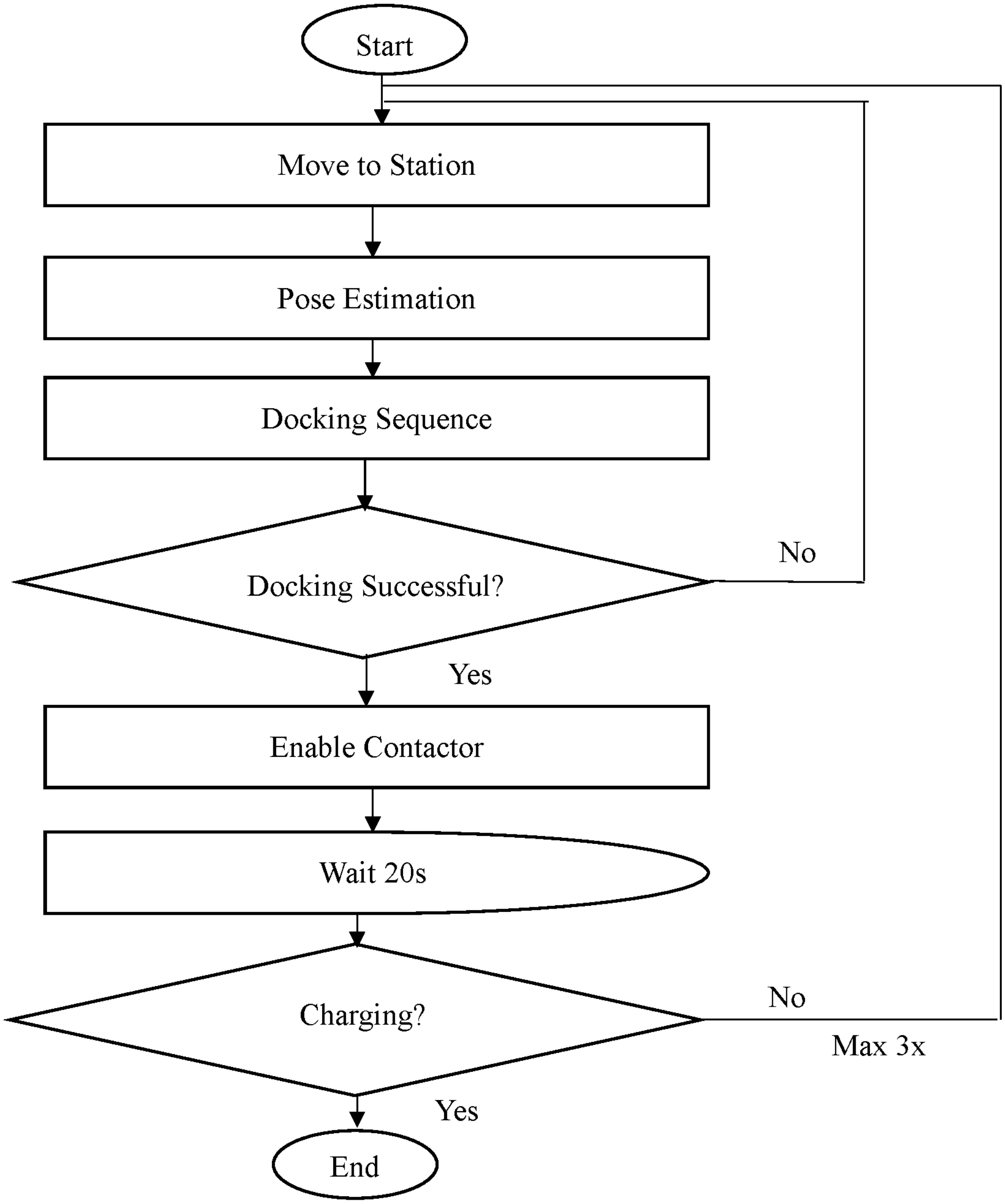
FIG. 13, with reference to FIGS. 1 through 12, depicts an exemplary flow chart illustrating an autodocking process for charging the chargeable mobile device using the automated docking system 100 of FIG. 1, in accordance with an embodiment of the present disclosure.

FIG. 13, with reference to FIGS. 1 through 12, depicts an exemplary flow chart illustrating an autodocking process for charging the chargeable mobile device 106 using the automated docking system 100 of FIG. 1, in accordance with an embodiment of the present disclosure. The steps of the autodocking process of the present disclosure will now be explained with reference to components of the chargeable mobile device 106 of FIG. 12, FIGS. 1 through 12, and the flow diagram as depicted in FIG. 13. As shown in FIG. 1, at first step, the chargeable mobile device 106 requests the fleet management system (FMS) 104 to identify a docking station from a plurality of docking stations 106 in a predefined region for charging when a battery level of the chargeable mobile device falls below a predefined threshold. In other words, when the battery level of the chargeable mobile device 106 drops below the predefined threshold, the chargeable mobile device 106 requests the fleet management system (FMS) 104 for nearby chargers. Based on availability, shortest distance, power capability, a docking station is identified and assigned to the chargeable mobile device 106. Further, the chargeable mobile device 106 first reaches the identified docking station's location and scans for a charging dock. At next step, the position and orientation of the identified docking station is estimated using a plurality of docking station data acquired by the chargeable mobile device 106. The plurality of docking station data is acquired using one or more sensors and other components of the chargeable mobile device 106. The plurality of docking station data comprises reflection pattern intensity of the docking station 102 obtained using the LIDAR sensors, unique V-shape patterns created on the housing cover 508, the plurality of visual fiducial markers, and the combination of 2D and 3D markers. Further, the autodocking process of the automated docking system 100 for charging the chargeable mobile device 106 is performed based on the position and orientation of the identified docking station 102. In other words, once the position and orientation of dock is identified, the chargeable mobile device 106 proceeds to dock with the identified docking station 102. Furthermore, a charging status of the chargeable mobile device 106 is determined when the autodocking process of the automated docking system 100 is complete. This means that the chargeable mobile device 106 engages its power contactor completing connection to the charger upon successful dock which is recognized by a hall sensor built into the dock. The power contactor ensures the charging pad 428 is isolated from battery when not in use. However, if the chargeable mobile device 106 does not start charging after 20 seconds post successful docking, an alert is sent to the fleet management network 104 about the charging status of the chargeable mobile device 106.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. An automated docking system for charging a chargeable mobile device, the automated docking system comprising:

a docking station, wherein the docking station comprises:

a base assembly, wherein the base assembly comprises:

a base plate, wherein the base plate comprises a first end, a second end, a plurality of mounting holes adapted for provisioning grouting and a plurality of mounting holes adapted for provisioning a battery charger mount plate, and wherein the first end of the base plate is connected to a first dead weight and the second end of the base plate is connected to a second dead weight;

a rear plate coupled to the base plate through a plurality of coil springs, wherein each of the plurality of coil springs is adapted to provide a cushioning effect for the docking station during an autodocking process of the automated docking system for charging the chargeable mobile device;

a floating assembly, wherein the floating assembly comprises:

a rod housing, wherein the rod housing comprises a first side and a second side, and wherein each side of the rod housing comprises a set of holes;

a floating plate, wherein the floating plate comprises a pair of flanges and a flat portion substantially protruding towards an angular assembly, wherein each flange of the pair of flanges comprises a corresponding hole;

a first set of guide rods, wherein each guide rod of the first set of guide rods comprises a first end and a second end, and wherein each guide rod of the first set of guide rods is adapted to pass through a corresponding hole of a set of holes at a corresponding side of the rod housing, and each of the first end and the second end of each of the first set of guide rods is connected to a corresponding flange from the pair of flanges of the floating plate via one or more screws;

a pair of stoppers, wherein each stopper from the pair of stoppers is connected to a corresponding side from the first side and the second side of the rod housing and is adapted to adjust a lateral stroke required for the auto docking process of the automated docking system; and a first set of tension springs inserted over the first set of guide rods and positioned between the rod housing and the pair of flanges of the floating plate, wherein the first set of tension springs is adapted to permit a lateral movement of the docking station from an initial position to a desired position during the autodocking process of the automated docking system for charging the chargeable mobile device;

a center assembly, wherein the center assembly comprises:

a mounting block having a plurality of holes;

a second set of guide rods, wherein each guide rod of the second set of guide rods comprises a first end and a second end, and wherein the first end of each guide rod of the second set of guide rods is sliding inside a corresponding hole of the plurality of holes of the mounting block and connected with each other by a small plate and one or more screws, and the second end of each guide rod of the second set of guide rods is coupled to the rod housing; and a second set of tension springs inserted over the second set of guide rods and positioned between the rod housing and the mounting block, wherein the second set of tension springs is adapted to permit a longitudinal movement of the docking station from an initial position to a desired position during the autodocking process of the automated docking system for charging the chargeable mobile device;

the angular assembly configured to provide an angular motion to the docking station during the autodocking process of the automated docking system for charging the chargeable mobile device; and a fleet management network comprising a plurality of the chargeable mobile devices to be charged at the docking station.

2. The automated docking system as claimed in claim 1, wherein the angular assembly comprises:

a table assembly mounted on the floating plate;

a charging pad mounting plate, wherein the charging pad mounting plate comprises a top surface and a bottom surface;

a charging pad, wherein the charging pad is coupled to the table assembly through the charging pad mounting plate;

a plurality of standoffs, wherein each standoff from the plurality of standoffs comprises a first end and a second end, and wherein the first end of each standoff from the plurality of standoffs is connected to the charging pad mounting plate;

a plurality of rollers, wherein each roller from the plurality of rollers is adapted to be connected to a corresponding second end of standoff from the plurality of standoffs via a screwing mechanism;

a plurality of self-centering springs, wherein each self-centering spring from the plurality of self-centering springs comprises a first end and a second end, and wherein the first end of each self-centering spring from the plurality of self-centering springs is connected to a first set of pins mounted on the floating plate and the second end of each self-centering spring from the plurality of self-centering springs is connected to a second set of pins mounted on to the bottom surface of the charging pad mounting plate;

a ball plunger, wherein the ball plunger comprises a first end and a second end, and wherein the first end of the ball plunger is adapted to be in contact with a hole made on the floating plate when the automated docking system is in an idle state and the second end of the ball plunger is mounted to the charging pad mounting plate; and a plurality of angle restrictors adapted to control the angular motion of the angular assembly, wherein the plurality of angle restrictors are mounted onto the floating plate and positioned adjacent to the ball plunger.

3. The automated docking system as claimed in claim 1, comprises a housing cover enclosing the docking station and mounted to the base plate of the base assembly, wherein the housing cover comprises a plurality of patterns that enable the plurality of chargeable devices a position and orientation (pose) detection of the docking station.

4. The automated docking system as claimed in claim 1, wherein the battery charger mount plate is adapted to hold a battery charger with help of a toggle clamp which is mounted onto the battery charger mount plate.

5. The automated docking system as claimed in claim 1, wherein the table assembly is a turn table assembly.

6. The automated docking system as claimed in claim 2, wherein the plurality of rollers are configured to guide docking element mounted to each of the plurality of chargeable devices.

7. The automated docking system as claimed in claim 2, wherein the plurality of self-centering springs are configured to ensure keeping the angular assembly at center with help of the ball plunger.

* * * * *